(12) United States Patent
Jung et al.

(10) Patent No.: US 10,193,148 B2
(45) Date of Patent: Jan. 29, 2019

(54) CARBON-SILICON COMPOSITE AND MANUFACTURING METHOD THEREOF

(71) Applicant: OCI COMPANY LTD., Seoul (KR)

(72) Inventors: Sung-Ho Jung, Seongnam-si (KR); Yo-Seop Kim, Seongnam-si (KR); Eun-Hye Jeong, Seongnam-si (KR); Jeong-Hyun Ha, Seongnam-si (KR)

(73) Assignee: OCI COMPANY LTD., Seoul (KR)

( * ) Notice: Subject to any disclaimer, the term of this patent is extended or adjusted under 35 U.S.C. 154(b) by 645 days.

(21) Appl. No.: 14/835,715

(22) Filed: Aug. 26, 2015

(65) Prior Publication Data

US 2016/0064731 A1    Mar. 3, 2016

(30) Foreign Application Priority Data

Sep. 3, 2014 (KR) .......................... 10-2014-0116577

(51) Int. Cl.
*H01M 4/38* (2006.01)
*H01M 4/583* (2010.01)
(Continued)

(52) U.S. Cl.
CPC .......... *H01M 4/386* (2013.01); *H01M 4/134* (2013.01); *H01M 4/583* (2013.01); *H01M 4/62* (2013.01); *H01M 10/052* (2013.01)

(58) Field of Classification Search
None
See application file for complete search history.

(56) References Cited

U.S. PATENT DOCUMENTS

| | | | | |
|---|---|---|---|---|
| 2014/0242455 A1* | 8/2014 | Ryu | ........................ | H01M 4/364 429/188 |
| 2015/0162617 A1* | 6/2015 | Liu | ........................ | H01M 4/583 429/218.1 |
| 2016/0276668 A1* | 9/2016 | Nagayama | ............ | H01M 4/587 |

FOREIGN PATENT DOCUMENTS

| | | |
|---|---|---|
| CN | 101632187 A | 1/2010 |
| CN | 102089240 A | 6/2011 |

(Continued)

OTHER PUBLICATIONS

Japanese Office Action dated Sep. 6, 2016 in connection with the counterpart Japanese Patent Application No. 2015-172746.

(Continued)

*Primary Examiner* — Alix E Eggerding
(74) *Attorney, Agent, or Firm* — Hauptman Ham, LLP

(57) ABSTRACT

Disclosed herein are a manufacturing method of a carbon-silicon composite, the manufacturing method including: (a) preparing a silicon-carbon-polymer matrix slurry including a silicon slurry, carbon particles, a monomer of polymer, and a cross-linking agent; (b) performing a heat treatment process on the silicon-carbon-polymer matrix slurry to manufacture a silicon-carbon-polymer carbonized matrix; (c) pulverizing the silicon-carbon-polymer carbonized matrix to manufacture a silicon-carbon-polymer carbonized matrix structure; and (d) mixing the silicon-carbon-polymer carbonized matrix structure with a first carbon raw material and performing a carbonization process to manufacture a carbon-silicon composite, the carbon-silicon composite, an anode for a secondary battery manufactured by applying the carbon-silicon composite, and a secondary battery including the anode for a secondary battery.

18 Claims, 4 Drawing Sheets

(51) Int. Cl.
    *H01M 4/134*     (2010.01)
    *H01M 4/62*     (2006.01)
    *H01M 10/052*     (2010.01)

(56) References Cited

FOREIGN PATENT DOCUMENTS

| | | |
|---|---|---|
| JP | 2008-277232 A | 11/2008 |
| JP | 2011-527982 A | 11/2011 |
| KR | 1020090086456 A | 8/2009 |
| KR | 1020100119945 A | 11/2010 |

OTHER PUBLICATIONS

Korean Office Action dated Sep. 23, 2015 in connection with the counterpart Korean Patent Application No. 10-2014-0116577.
Chinese Office Action dated Jul. 3, 2017 in connection with the counterpart Chinese Patent Application No. 201510556167.0.

* cited by examiner

CARBON-SILICON COMPOSITE AND MANUFACTURING METHOD THEREOF

CROSS REFERENCE TO RELATED APPLICATION

This application claims the benefit of Korean Patent Application No. 10-2014-0116577, filed on Sep. 3, 2014, entitled "CARBON-SILICON COMPOSITE AND MANUFACTURING METHOD THEREOF", which is hereby incorporated by reference in its entirety into this application.

TECHNICAL FIELD

The present invention relates to a carbon-silicon composite and a manufacturing method thereof.

BACKGROUND ART

An anode material of a lithium secondary battery capable of implementing high capacity is required to be used for a battery for an information technology (IT) equipment or a battery for an automobile. Accordingly, silicon has attracted attention as the anode material of the lithium secondary battery with high capacity. For example, it is known that pure silicon has a high theoretical capacity of 4200 mAh/g.

However, as compared with a carbon-based material, silicon has deteriorated cycle property, which is still an obstacle to practical use. The reason is because when inorganic particles such as silicon for an anode active material are directly used as a material for absorption and release of lithium, conductivity between active materials is deteriorated due to a change in volume during a charge and discharge process, or the anode active material is separated from an anode current collector. That is, inorganic particles such as silicon included in the anode active material absorb lithium by a charge process to expand so as to be about 300% to 400% in volume. In addition, when the lithium is released by a discharge process, the inorganic particles are contracted, and when the charge and discharge cycles are repeated, electrical insulation may occur due to empty space generated between the inorganic particles and the anode active material to cause rapid deterioration in lifespan, and therefore, the inorganic particles have a serious problem in being used for a secondary battery.

DISCLOSURE

Technical Problem

An aspect of the present invention is to provide a manufacturing method of a carbon-silicon composite, and the carbon-silicon composite, wherein the manufacturing method includes: (a) preparing a silicon-carbon-polymer matrix slurry including a silicon slurry, carbon particles, a monomer of polymer, and a cross-linking agent; (b) performing a heat treatment process on the silicon-carbon-polymer matrix slurry to manufacture a silicon-carbon-polymer carbonized matrix; (c) pulverizing the silicon-carbon-polymer carbonized matrix to manufacture a silicon-carbon-polymer carbonized matrix structure; and (d) mixing the silicon-carbon-polymer carbonized matrix structure with a first carbon raw material and performing a carbonization process to manufacture a carbon-silicon composite.

However, technical problems to be achieved in the present invention are not limited to the above-mentioned problems, and other problems will be clearly understood to those skilled in the art from the following descriptions.

Technical Solution

In accordance with one aspect of the present invention, there is provided a manufacturing method of a carbon-silicon composite, including: (a) preparing a silicon-carbon-polymer matrix slurry including a silicon slurry, carbon particles, a monomer of polymer, and a cross-linking agent; (b) performing a heat treatment process on the silicon-carbon-polymer matrix slurry to manufacture a silicon-carbon-polymer carbonized matrix; (c) pulverizing the silicon-carbon-polymer carbonized matrix to manufacture a silicon-carbon-polymer carbonized matrix structure; and (d) mixing the silicon-carbon-polymer carbonized matrix structure with a first carbon raw material and performing a carbonization process to manufacture a carbon-silicon composite.

The carbon particles in (a) may include at least one selected from the group consisting of natural graphite, artificial graphite, soft carbon, hard carbon, pitch carbide, calcined coke, graphene, carbon nanotube, and combinations thereof.

When a particle diameter at 50% cumulative mass particle size distribution of silicon in the silicon slurry in (a), is D50, 2 nm<D50<180 nm may be satisfied.

The monomer of polymer in (a) may be at least one selected from the group consisting of acrylic acid, acrylate, methyl methacrylic acid, methyl methacrylate, acryamide, vinyl acetate, maleic acid, styrene, acrylonitrile, phenol, ethylene glycol, lauryl methacrylate and vinyl difluoride.

The cross-linking agent in (a) may be at least one selected from the group consisting of polyethylene glycol dimethacrylate, polyethylene glycol diacrylate, diethylene glycol dimethacrylate, diethylene glycol diacrylate, triethylene glycol diacrylate, tetraethylene glycol diacrylate, N,N-methylenebisacrylamide, N,N-(1,2-dihydroxyethylene)bisacrylamide) and divinylbenzene.

The monomer of polymer may have 30 to 100 parts by weight, and the cross-linking agent has 5 to 100 parts by weight, in relation to 100 parts by weight of the silicon slurry in (a).

The silicon-carbon-polymer carbonized matrix in (b) may have a network structure which is cross-linked by the cross-linking agent.

The heat treatment process in (b) may be performed at 300° C. to 500° C. for 0.5 to 5 hours.

The carbonization process in (d) may be performed at 400° C. to 1400° C. for 1 to 24 hours.

The manufacturing method may further include: (e) mixing the carbon-silicon composite with a second carbon raw material, and then performing an additional carbonization process.

In accordance with another aspect of the present invention, there is provided a carbon-silicon composite including: a silicon-carbon-polymer carbonized matrix structure formed from a silicon-carbon-polymer matrix slurry including a silicon slurry, carbon particles, a monomer of polymer, and a cross-linking agent; and a first carbon body, wherein the silicon-carbon-polymer carbonized matrix structure is captured and dispersed in the first carbon body.

In the silicon-carbon-polymer carbonized matrix structure, the carbon particles may be disposed to form inner pores and the silicon may be dispersed while being bound to the carbon particles.

The carbon particles may include at least one selected from the group consisting of natural graphite, artificial graphite, soft carbon, hard carbon, pitch carbide, calcined coke, graphene, carbon nanotube, and combinations thereof.

The first carbon body may include at least one selected from the group consisting of soft carbon, hard carbon, pitch carbide, calcined coke, graphene, carbon nanotube, and combinations thereof.

A weight ratio of silicon (Si) to carbon (C) may be 1:99 to 10:90. The first carbon body may have 50 to 94 wt % and the silicon-carbon-polymer carbonized matrix structure may have 6 to 50 wt %, in relation to total weight of the carbon-silicon composite.

The silicon-carbon-polymer carbonized matrix structure may have a porosity higher than that of the first carbon body.

The carbon-silicon composite may further include: a second carbon body.

The second carbon body may include at least one selected from the group consisting of natural graphite, artificial graphite, soft carbon, hard carbon, pitch carbide, calcined coke, graphene, carbon nanotube, and combinations thereof.

In accordance with another aspect of the present invention, there is provided an anode for a secondary battery manufactured by coating an anode slurry on an anode current collector, the anode slurry including: the carbon-silicon composite as described above; a conductive material; a binder; and a thickening agent.

In accordance with still another aspect of the present invention, there is provided a secondary battery including the anode for a secondary battery as described above.

Advantageous Effects

The silicon-carbon-polymer matrix slurry according to the present invention may include silicon bound to the carbon particles to be significantly uniformly dispersed without layer separation, and the silicon-carbon-polymer carbonized matrix formed from the silicon-carbon-polymer matrix slurry may have a network structure which is cross-linked by a cross-linking agent, such that when the carbon-silicon composite including the silicon-carbon-polymer carbonized matrix is used as an anode active material for a secondary battery, charge capacity, and charge and discharge stability of the secondary battery may be further improved.

BEST MODE

Figure 1:
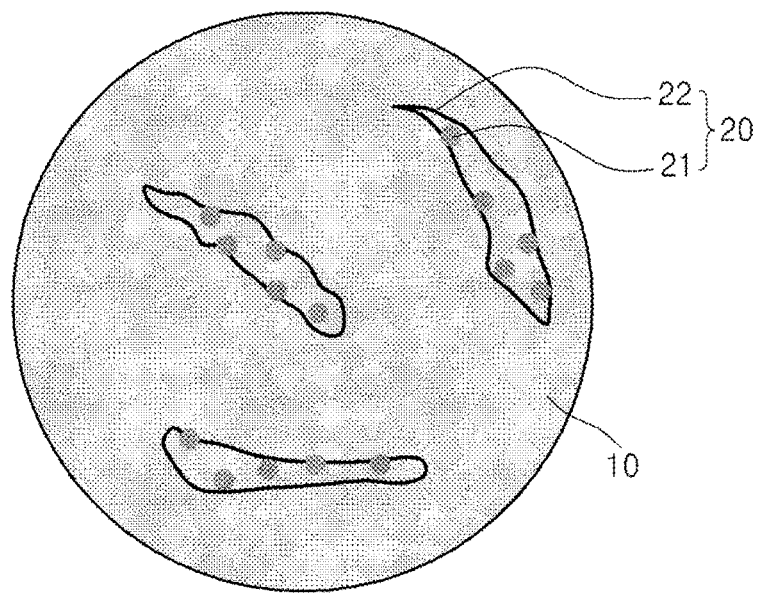
FIG. 1 is a cross-sectional view schematically illustrating a carbon-silicon composite according to an exemplary embodiment of the present invention.

Hereinafter, exemplary embodiments of the present invention will be described in detail. However, the following examples are only provided as one embodiment of the present invention, and the present invention is not limited to the following Examples.

Manufacturing Method of Carbon-Silicon Composite

The present invention provides a manufacturing method of a carbon-silicon composite, including: (a) preparing a silicon-carbon-polymer matrix slurry including a silicon slurry, carbon particles, a monomer of polymer, and a cross-linking agent; (b) performing a heat treatment process on the silicon-carbon-polymer matrix slurry to manufacture a silicon-carbon-polymer carbonized matrix; (c) pulverizing the silicon-carbon-polymer carbonized matrix to manufacture a silicon-carbon-polymer carbonized matrix structure; and (d) mixing the silicon-carbon-polymer carbonized matrix structure with a first carbon raw material and performing a carbonization process to manufacture a carbon-silicon composite.

The step (a) is a step of preparing the silicon-carbon-polymer matrix slurry including a silicon slurry, carbon particles, a monomer of polymer, and a cross-linking agent, wherein the silicon-carbon-polymer matrix slurry may be prepared by adding the carbon particles, the monomer of polymer, and the cross-linking agent to the silicon slurry, and mixing with each other.

Here, the silicon-carbon-polymer matrix slurry refers to a slurry including the silicon-carbon-polymer matrix, wherein the silicon (Si) in the silicon-carbon-polymer matrix slurry is characterized by being bound to the carbon particles and being significantly uniformly dispersed without layer separation.

The silicon slurry refers to a slurry including silicon particles and dispersion medium, wherein the silicon particles may be spherical having a diameter of 2 nm to 200 nm, and the dispersion medium is a solvent for further improving dispersibility and stability of the silicon slurry, and may be at least one selected from the group consisting of N-methyl-2-pyrrolidone (NMP), tetrahydrofuran (THF), water, methanol, ethanol, cyclohexanol, cyclohexanone, methyl ethyl ketone, acetone, dimethyl sulfoxide (DMSO), and combinations thereof, but the present invention is not limited thereto. Here, when the N-methyl-2-pyrrolidone (NMP) solvent or the tetrahydrofuran (THF) solvent is used, more excellent dispersibility and stability are provided.

When a particle diameter at 50% cumulative mass particle size distribution of silicon in the silicon slurry, is D50, 2 nm<D50<180 nm may be satisfied. That is, silicon in the silicon slurry is uniformly dispersed to provide more excellent dispersibility and stability, such that silicon is characterized by having a small average particle size The carbon particles preferably includes at least one selected from the group consisting of natural graphite, artificial graphite, soft carbon, hard carbon, pitch carbide, calcined coke, graphene, carbon nanotube, and combinations thereof, more preferably, includes natural graphite or artificial graphite, but the present invention is not limited thereto.

When the carbon particles are graphite such as natural graphite or artificial graphite, the graphite may have a plate shape or fragment shape. The graphite has a plate shape or fragment shape as described above, a plurality of graphites may be easily connected to each other to form an outer wall of the silicon-carbon-polymer carbonized matrix structure, and may easily form the inner pores. In particular, when the graphite has a plate shape or a fragment shape, the graphite is easily bound to the first carbon raw material to form the inner pores, and it is easy to capture silicon in the pores, which is unlike a case in which the graphite has a spherical shape.

The monomer of polymer is a starting material for forming a polymer, and functions as a buffer of silicon. The monomer of polymer includes at least one selected from the group consisting of acrylic acid, acrylate, methyl methacrylic acid, methyl methacrylate, acryamide, vinyl acetate, maleic acid, styrene, acrylonitrile, phenol, ethylene glycol, lauryl methacrylate, and vinyl difluoride, but the present invention is not limited thereto. In the present invention, acrylic acid was used as the monomer of polymer.

The cross-linking agent serves to allow a polymer formed from the monomer of polymer to be cross-linked to each other, such that the silicon-carbon-polymer matrix has a network structure to improve dispersibility of silicon. The cross-linking agent is preferably at least one selected from the group consisting of polyethylene glycol dimethacrylate, polyethylene glycol diacrylate, diethylene glycol dimethacrylate, diethylene glycol diacrylate, triethylene glycol diacrylate, tetraethylene glycol diacrylate, N,N-methylenebisacrylamide, N,N-(1,2-dihydroxyethylene)bisacrylamide, and divinylbenzene, but the present invention is not limited thereto. In the present invention, polyethylene glycol dimethacrylate was used as the cross-linking agent.

The silicon-carbon-polymer matrix slurry may further include an additive. Here, an initiator used as the additive may be a radical polymerization initiator, and may be preferably at least one selected from the group consisting of 1,1'-azobis(cyclohexanecarbonitrile) (ABCN), azobisisobutyronitrile (AIBN), benzophenone, 2,2-dimethoxy-2-phenyl acetophenone, and benzoyl peroxide, but the present invention is not limited thereto. In the present invention, 1,1'-azobis(cyclohexanecarbonitrile) (ABCN) was used as the radical polymerization initiator.

The silicon-carbon-polymer matrix in the silicon-carbon-polymer matrix slurry may have a network structure which is cross-linked by the cross-linking agent.

In the present specification, 'the network structure' means a structure designed as a micro model of an amorphous polymer material with a cross-linking point, which consists of knots and chains connecting knots.

Here, silicon is bound to the carbon particles and uniformly dispersed in the polymer matrix with the network structure, and the polymer matrix with the network structure is appropriate for a material serving as a buffer for silicon and improving dispersibility of silicon.

In addition, due to the polymer matrix, silicon in the silicon-carbon-polymer matrix slurry may be bound to the carbon particles to be significantly uniformly dispersed without layer separation. Here, due to the cross-linkage by the cross-linking agent, the polymer matrix may be formed in a gel type.

The monomer of polymer preferably has 30 to 100 parts by weight, and the cross-linking agent preferably has 5 to 100 parts by weight, in relation to 100 parts by weight of the silicon slurry, but the present invention is not limited thereto.

The step (b) is a step to perform a heat treatment process on the silicon-carbon-polymer matrix slurry to manufacture the silicon-carbon-polymer carbonized matrix.

Here, the silicon-carbon-polymer carbonized matrix is manufactured by performing the heat treatment process on the silicon-carbon-polymer matrix slurry, and may have a network structure which is cross-linked by the cross-linking agent.

That is, the silicon-carbon-polymer carbonized matrix has a network structure which is cross-linked by the cross-linking agent, and accordingly, in a process for manufacturing the composite by using the silicon-carbon-polymer carbonized matrix structure together with the first carbon raw material, the silicon-carbon-polymer carbonized matrix may not agglomerate the silicon-carbon-polymer carbonized matrix structures to each other having an integrated structure in which silicon is bound to the carbon particles as it is, and therefore, the silicon-carbon-polymer carbonized matrix structure may be uniformly and excellently dispersed in the first carbon raw material without forming large agglomeration. Therefore, when the silicon-carbon-polymer carbonized matrix is used to manufacture an anode active material for a secondary battery, the secondary battery may remarkably increase an initial charge capacity and remarkably alleviate a problem of deterioration in charge capacity after several cycles to more improve lifespan property.

In addition, the heat treatment process may be performed by heat-treating the silicon-carbon-polymer matrix slurry at a temperature of 50 to 600° C., under low pressure to high pressure ranging from 0.5 bar to 10 bar according to purposes, and for 0.5 to 5 hours. The heat treatment process may be performed by one stage or by multiple stages according to desired usages.

Preferably, the heat treatment process may be performed under an atmospheric pressure at 300° C. to 500° C. for 0.5 to 5 hours, more preferably, under an atmospheric pressure at 400° C. for 1 hour.

The step (c) is a step of pulverizing the silicon-carbon-polymer carbonized matrix to manufacture the silicon-carbon-polymer carbonized matrix structure, wherein the silicon-carbon-polymer carbonized matrix may be pulverized so that the manufactured silicon-carbon-polymer carbonized matrix structure may be uniformly mixed in the first carbon raw material while having an integrated structure in which the carbon particles are bound to silicon as it is.

The step (d) is a step of mixing the silicon-carbon-polymer carbonized matrix structure with the first carbon raw material, and then performing a carbonization process.

Here, the silicon-carbon-polymer carbonized matrix structure and the first carbon raw material are mixed with each other in a particle shape, wherein the first carbon raw material preferably includes at least one selected from the group consisting of soft carbon, hard carbon, pitch, coke, graphene, carbon nanotube, and combinations thereof, but the present invention is not limited thereto. Specifically, as the first carbon raw material, commercially available products of coal tar pitch or petroleum pitch may be generally used. The first carbon raw material is carbonized by the subsequent carbonization process to be formed as a carbon matrix including crystalline carbon, amorphous carbon, or both of crystalline carbon and amorphous carbon. The first carbon raw material may be used without classification between conductive and non-conductive carbon materials.

The silicon-carbon-polymer carbonized matrix structure may be mixed with the first carbon raw material in the mixed powder so that a weight ratio of silicon (Si) to carbon (C) is 1:99 to 10:90. An appropriate content of the silicon-carbon-polymer carbonized matrix structure and an appropriate content of the first carbon raw material are mixed with each other so as to include silicon (Si) and carbon (C) at a weight ratio within the above-described range. When the carbon-silicon composite manufactured as above is applied for an anode active material for a secondary battery, a volume expansion problem in a charge and discharge process may be alleviated to improve lifespan property of the secondary battery while effectively exhibiting properties of high capacity silicon.

In the present invention, the carbonization process refers to a process of sintering a carbon raw material at a high temperature to leave carbon as an inorganic material, and by the carbonization process, the first carbon body is formed from the first carbon raw material.

For example, the first carbon raw material may have a carbonization yield of 40 to 80 wt % in the carbonization process. By increasing the carbonization yield of the carbonization process in the method of manufacturing the carbon-silicon composite, occurrence of volatile matter may be reduced, and disposal may be easily performed, which makes an environmentally friendly process.

The carbonization process may be performed by heat-treating the mixed powder at a temperature of 400 to 1400° C., under low pressure to high pressure ranging from 1 bar to 15 bar according to purposes, and for 1 to 24 hours. The carbonization process may be performed by one stage or by multiple stages according to desired usages.

The manufacturing method may further include: (e) mixing the carbon-silicon composite with a second carbon raw material, and then performing a carbonization process.

Here, the carbon-silicon composite and the second carbon raw material are mixed with each other in a particle shape, wherein the second carbon raw material preferably includes at least one selected from the group consisting of natural graphite, artificial graphite, soft carbon, hard carbon, pitch, coke, graphene, carbon nanotube, and combinations thereof, but the present invention is not limited thereto.

The second carbon body may be formed from the second carbon raw material by the carbonization process, and specific conditions of the carbonization process are the same as described in (d).

Carbon-Silicon Composite

In addition, the present invention provides a carbon-silicon composite including: a silicon-carbon-polymer carbonized matrix structure formed from a silicon-carbon-polymer matrix slurry including a silicon slurry, carbon particles, a monomer of polymer, and a cross-linking agent; and a first carbon body, wherein the silicon-carbon-polymer carbonized matrix structure is captured and dispersed in the first carbon body.

FIG. 1 is a cross-sectional view schematically illustrating a carbon-silicon composite according to an exemplary embodiment of the present invention.

As shown in FIG. 1, the carbon-silicon composite 1 according to an exemplary embodiment of the present invention is formed by including the first carbon raw material 10; the silicon-carbon-polymer carbonized matrix structure 20 captured and dispersed in the first carbon raw material 10.

Specifically, the carbon particles 22 in the silicon-carbon-polymer carbonized matrix structure 20 may be disposed so as to form inner pores, and the silicon 21 may be dispersed while being bound to the graphite.

First, the carbon-silicon composite according to the present invention includes a first carbon body as a main component.

The first carbon body is formed from a first carbon raw material, preferably includes at least one selected from the group consisting of soft carbon, hard carbon, pitch carbide, calcined coke, graphene, carbon nanotube, and combinations thereof, more preferably, pitch carbide, but the present invention is not limited thereto.

The first carbon body preferably has 50 to 94 wt %, more preferably, has 60 to 70 wt %, in relation to total weight of the carbon-silicon composite, but the present invention is not limited thereto. Here, when a content of the first carbon body is less than the above-described range, since stability is reduced, capacity retention rate is reduced at the time of charging and discharging, and when a content of the first carbon body is more than the above-described range, electrode capacity is reduced.

Next, the carbon-silicon composite according to the present invention includes the silicon-carbon-polymer carbonized matrix structure captured in the first carbon body and dispersed.

Upon reviewing a structure of the silicon-carbon-polymer carbonized matrix structure, the carbon particles in the silicon-carbon-polymer carbonized matrix structure may form the outer wall so as to form the inner pores, silicon may be bound to the carbon particles and dispersed, and a portion of the silicon may be intensively dispersed in the inner pores, thereby forming an integrated structure. That is, the silicon-carbon-polymer carbonized matrix structure has an integrated structure in which the carbon particles disposed to form the inner pores are bound to silicon. Here, a portion of the silicon may be intensively dispersed in the inner pores, and the rest portion of the silicon may be dispersed in an outer portion of the inner pores.

The silicon-carbon-polymer carbonized matrix structure may be formed from the silicon-carbon-polymer matrix slurry including a silicon slurry, carbon particles, a monomer of polymer, and a cross-linking agent.

Specific components of the silicon-carbon-polymer matrix slurry have been described above.

The silicon-carbon-polymer carbonized matrix structure preferably has 6 to 50 wt %, more preferably, has 30 to 40 wt %, in relation to total weight of the carbon-silicon composite, but the present invention is not limited thereto. Here, when a content of the silicon-carbon-polymer carbonized matrix structure is less than the above-described range, it is difficult to exhibit high capacity, and when a content of the silicon-carbon-polymer carbonized matrix structure is more than the above-described range, stability is reduced, such that it is difficult to retain capacity at the time of charging and discharging.

In a process for manufacturing the carbon-silicon composite by mixing the silicon-carbon-polymer carbonized matrix structure together with the first carbon body, the carbon-silicon composite may not agglomerate the silicon-carbon-polymer carbonized matrix structures to each other having an integrated structure in which silicon is bound to the carbon particles as it is, and therefore, the silicon-carbon-polymer carbonized matrix structure may be captured to be uniformly and excellently dispersed in the first carbon body without forming large agglomeration. As described above, the silicon-carbon-polymer carbonized matrix structure may be uniformly dispersed throughout the first carbon body of the carbon-silicon composite. When the carbon-silicon composite is applied for an anode active material for a secondary battery, a volume expansion problem in a charge and discharge process may be alleviated to improve lifespan property of the secondary battery while effectively exhibiting properties of high capacity silicon and carbon particles.

The carbon-silicon composite having more uniformly and excellently dispersed the silicon-carbon-polymer carbonized matrix structure may exhibit more improved charge capacity and charge and discharge stability of the secondary battery at the time of using the carbon-silicon composite as an anode active material for a secondary battery, even though it includes the same content of silicon or carbon particles.

In the carbon-silicon composite, a weight ratio of silicon (Si) to carbon (C) may be 1:99 to 10:90. The carbon-silicon composite may contain a high content of silicon within the above-described numerical scope, and also include excellently dispersed silicon-carbon-polymer carbonized matrix structure while containing the high content of silicon, such that a volume expansion problem caused in a charge and discharge process at the time of using the silicon as the anode active material, may be alleviated.

For example, the carbon-silicon composite rarely includes oxides which are possible to deteriorate performance of the secondary battery, such that an oxygen content of the carbon-silicon composite is significantly low. Specifically, the carbon-silicon composite may have an oxygen content of 0 wt % to 1 wt %. In addition, the first carbon body rarely includes other impurities and by-product compounds, and mostly consists of carbon. Specifically, the first carbon body may have a carbon content of 70 wt % to 100 wt %.

As described above, in the carbon-silicon composite, the silicon-carbon-polymer carbonized matrix structure is distributed throughout an inner region of the first carbon body, that is, the silicon-carbon-polymer carbonized matrix structure is excellently dispersed and present inside of the first carbon body as well as at a surface side thereof. Specifically, the description that the silicon-carbon-polymer carbonized matrix structure is excellently dispersed and present inside means that the silicon-carbon-polymer carbonized matrix structure is captured and present inside over a depth corresponding to 5% of a radius of the carbon-silicon composite. More specifically, since the silicon-carbon-polymer carbonized matrix structure is present at a depth corresponding to 1% to 100% of the radius of the carbon-silicon composite, the carbon-silicon composite according to the present invention is differentiated from a carbon-silicon composite in which silicon-carbon-polymer carbonized matrix structure is distributed only at a surface side corresponding to a depth corresponding to less than 5% of the radius. Obviously, the description that the silicon-carbon-polymer carbonized matrix structure is present at a depth corresponding to 1% to 100% of the radius of the carbon-silicon composite does not exclude a case in which the silicon-carbon-polymer carbonized matrix structure is present at a depth corresponding to 0% to 1% of the radius of the carbon-silicon composite.

In addition, since it is general that the silicon-carbon-polymer carbonized matrix structures used as raw materials at the time of performing a carbonization process agglomerate to each other to be a clump, the carbon-silicon composite may include silicon-carbon-polymer carbonized matrix clump particles formed by agglomerating the silicon-carbon-polymer carbonized matrix structures to each other.

In the present specification, the description that the silicon-carbon-polymer carbonized matrix structure is uniformly excellent dispersed means that the silicon-carbon-polymer carbonized matrix structure is uniformly distributed throughout the first carbon body, and means that the silicon-carbon-polymer carbonized matrix clump particles are uniformly formed, which has a small deviation value in view of a statistical analysis of the silicon-carbon-polymer carbonized matrix clump particles, and specifically, means that the maximum value of a diameter of the silicon-carbon-polymer carbonized matrix clump particle may correspond to a predetermined level or less.

That is, since the silicon-carbon-polymer carbonized matrix structure is excellently dispersed in the carbon-silicon composite, the silicon-carbon-polymer carbonized matrix clump particles are also relatively decreased.

In the present specification, a diameter of a particle refers to a distance between two points defined upon contacting a straight passing the center of the particle with a surface of the particle.

The diameter of the particle may be measured by various methods according to known methods, for example, may be measured by using X-ray diffraction (XRD) or by analyzing scanning electron microscope (SEM) images.

The silicon-carbon-polymer carbonized matrix structure may have a porosity higher than that of the first carbon body. In a case of the polymer matrix structure, during a carbonization process, other impurities and by-product compound such as oxygen, hydrogen, or the like, except for carbon in the polymer matrix structure are not carbonized but vaporized, such that space where other impurities and by-product compound such as oxygen, hydrogen, or the like, except for carbon remain as an empty space, and therefore, the polymer carbonized matrix structure may have high porosity as compared to the first carbon body mostly consisting of carbon only.

Specifically, the polymer matrix structure preferably has a carbonization yield of 5% to 30%, and the first carbon body preferably has a carbonization yield 40% to 80%, but the present invention is not limited thereto. The first carbon body rarely includes other impurities and by-product compound, but mostly consists of carbon only, such that a carbonization yield in a carbonization process is remarkably excellent. The polymer matrix structure includes other impurities and by-product compound such as oxygen, hydrogen, or the like, except for carbon, such that a carbonization yield in a carbonization process is deteriorated.

In addition, the carbon-silicon composite may be formed in a spherical shape or in a spherical-like shape, and may be formed to be spheronized together with the second carbon body. Here, pores may be formed between the carbon-silicon composite and the second carbon body.

In order to spheronize the carbon-silicon composite and the second carbon body, known various methods and devices may be used.

The second carbon body is formed from a second carbon raw material, preferably includes at least one selected from the group consisting of natural graphite, artificial graphite, soft carbon, hard carbon, pitch carbide, calcined coke, graphene, carbon nanotube, and combinations thereof, but the present invention is not limited thereto.

Preferably, the first carbon body may be amorphous carbon, and the second carbon body may be crystalline carbon. For example, in a case in which the second carbon body is graphite, the second carbon body may have a plate shape or a fragment shape, and may be spheronized together with the carbon-silicon composite formed in a spherical shape, such that the spherical carbon-silicon composite may be spheronized in a state of being captured and dispersed among the layered second carbon bodies. Specifically, in a case in which the second carbon body is graphite, the second carbon body may have a plate shape or a fragment shape in which an average diameter is 0.5 μm to 500 μm, and a thickness is 0.01 μm to 100 μm, on a flat plane.

The carbon-silicon composite may further include an amorphous carbon coating layer as an outermost layer.

Anode for Secondary Battery

The present invention provides an anode for a secondary battery in which an anode slurry is coated on an anode current collector, the anode slurry including: the carbon-silicon composite as described above; a conductive material; a binder; and a thickening agent.

The anode for a secondary battery is formed by coating the anode slurry including the carbon-silicon composite; a conductive material; a binder; and a thickening agent on an anode current collector, followed by drying and rolling.

As the conductive material, at least one selected from the group consisting of a carbon-based material, a metal material, a metal oxide, and an electrically conductive polymer may be used. Specifically, carbon black, acetylene black, Ketjen black, furnace black, carbon fiber, fullerene, copper, nickel, aluminum, silver, cobalt oxide, titanium oxide, a polyphenylene derivative, polythiophene, polyacene, polyacetylene, polypyrrole, polyaniline, and the like, may be used.

As the binder, various kinds of binder polymers such as styrene-butadiene rubber (SBR), carboxymethyl cellulose (CMC), vinylidene fluoride-hexafluoropropylene copolymer (PVDF-co-HFP), polyvinylidenefluoride, polyacrylonitrile, polymethylmethacrylate, and the like, may be used. The thickening agent is to control viscosity, and may include carboxymethyl cellulose, hydroxymethyl cellulose, hydroxyethyl cellulose, hydroxypropyl cellulose, and the like.

As the anode current collector, stainless steel, nickel, copper, titanium, or alloys thereof, and the like, may be used. Among them, copper or copper alloy is the most preferred.

Secondary Battery

The present invention provides a secondary battery including the anode for a secondary battery as described above.

The carbon-silicon composite in which the silicon-carbon-polymer carbonized matrix structure in a nano size are significantly uniformly dispersed and included as an anode active material for a secondary battery is used in the secondary battery, such that the secondary battery may have more improved charge capacity and lifespan property.

The secondary battery includes the anode for a secondary battery; a cathode including a cathode active material; a separator; and an electrolyte.

As materials used as the cathode active material, compounds capable of absorbing and releasing lithium, such as $LiMn_2O_4$, $LiCoO_2$, $LiNiO_2$, $LiFeO_2$, and the like, may be used.

As the separator insulating the electrodes between the anode and the cathode, olefin-based porous films such as polyethylene, polypropylene, and the like, may be used.

In addition, the electrolyte may be obtained by mixing and dissolving at least one electrolyte including lithium salt selected from the group consisting of $LiPF_6$, LiBF4, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (provided that each of x and y is a natural number), LiCl, and LiI in at least one aprotic solvent selected from the group consisting of propylene carbonate, ethylene carbonate, butylene carbonate, benzonitrile, acetonitrile, tetrahydrofuran, 2-methyl tetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethyl carbonate, methyl ethyl carbonate, diethyl carbonate, methyl propyl carbonate, methyl isopropyl carbonate, ethyl propyl carbonate, dipropyl carbonate, diisopropyl carbonate, dibutyl carbonate, diethylene glycol, and dimethyl ether.

A plurality of secondary batteries may be electrically connected to each other to provide a middle- or large-sized battery module or a battery pack including the plurality of secondary batteries, wherein the middle- or large-sized battery module or the battery pack may be used as a power supply for at least any one middle- or large-sized device selected from power tools; electric vehicles including EV, hybrid electric vehicle (HEV), and plug-in hybrid electric vehicle (PHEV); electric trucks; electric commercial vehicles; or systems for energy storage.

Hereinafter, preferred embodiments of the present invention will be described to assist in understanding the present invention. However, the0 following exemplary embodiments are provided only to more easily understand the present invention. The present invention is not limited thereto.

EXAMPLE

Example 1

Manufacture of Silicon-Carbon-Polymer Carbonized Matrix Structure

A silicon slurry was prepared by dispersing 1 g of silicon particles having an average particle size of 50 nm in 9 g of N-methyl-2-pyrrolidone (NMP) functioning as a dispersion medium by ultrasonic treatment. Here, as a result obtained by measuring distribution property of silicon on the silicon slurry by a dynamic light scattering method (measurement device: ELS-Z2 manufactured by Otsuka Electronics), D50 was 120 nm.

7.5 g of a plate-shaped natural graphite (size: 15 μm) was added to the prepared silicon slurry, and stirred in a vortex. Then, 5 g of acrylic acid, 1 g of polyethylene glycol dimethacrylate, and 0.5 g of 1,1'-azobis(cyclohexane carbonitrile) were added thereto, and stirred at a temperature of about 70° C. for about 12 hours to prepare a silicon-graphite-polymer matrix slurry.

On the prepared silicon-graphite-polymer matrix slurry, a heat treatment process was additionally performed in an electric furnace at a temperature of about 400° C. for about 1 hour to manufacture silicon-graphite-polymer carbonized matrix, and the silicon-graphite-polymer carbonized matrix was pulverized by using a planetary mill at 250 rpm for about 30 minutes to manufacture a silicon-carbon-polymer carbonized matrix structure.

Manufacture of Carbon-Silicon Composite 2 g of the silicon-carbon-polymer carbonized matrix structure was mixed with 4.2 g of a coal-based pitch particulate evaporated at 350° C. in a mixer for about 12 hours. Then, a temperature was raised at a temperature at 10° C./min to perform a carbonization process at a temperature of 900° C. for 5 hours, thereby forming a carbon-silicon composite. The formed carbon-silicon composite was pulverized at 250 rpm for 1 hour by using a planetary mill, followed by a sorting process, to obtain powder only with selected particles each having a particle size of 50 μm or less.

Manufacture of Anode for Secondary Battery

A composition for an anode slurry was prepared by mixing the carbon-silicon composite powder used as an anode active material, carbon black (CB), carboxymethyl cellulose (CMC), and styrene butadiene (SBR) at a weight ratio of 91:5:2:2 with water. The composition for an anode slurry was coated on a copper current collector, and dried and rolled in an oven at 110° C. for about 1 hour, to manufacture an anode for a secondary battery.

Manufacture of Secondary Battery

A coin cell-type secondary battery was manufactured by stacking the anode for a secondary battery, a separator, an electrolyte (a solvent obtained by mixing ethylene carbonate with dimethyl carbonate at a weight ratio of 1:1, and adding 1.0M $LiPF_6$ thereto), and a lithium electrode.

Comparative Example 1

Carbon-silicon composite powder, and an anode for a secondary battery and a secondary battery to which the carbon-silicon composite powder is applied were manufactured by the same method as Example 1, except for using a silicon-graphite slurry without separately including an acrylic acid, polyethylene glycol dimethacrylate, and 1,1'-azobis(cyclohexane carbonitrile).

Comparative Example 2

Carbon-silicon composite powder, and an anode for a secondary battery and a secondary battery to which the carbon-silicon composite powder is applied were manufactured by the same method as Example 1, except for using a silicon-polymer matrix slurry without separately including graphite.

Comparative Example 3

An anode active material, and an anode for a secondary battery and a secondary battery to which the anode active material is applied were manufactured by the same method as Example 1, except for using a coal-based pitch alone evaporated at 350° C. instead of using the carbon-silicon composite powder.

Figure 2:
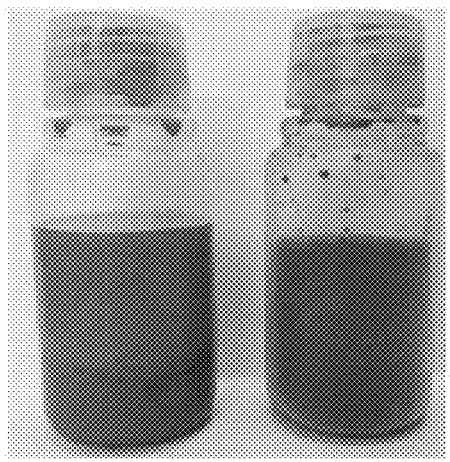
FIG. 2 illustrates results obtained by observing dispersion of carbon particles in silicon-carbon-polymer matrix slurries prepared by Example 1 and Comparative Example 1 with the naked eye.

FIG. 2 illustrates results obtained by observing dispersion of carbon particles in the silicon-carbon-polymer matrix slurry prepared by Example 1 (Right) and in the silicon-carbon slurry prepared by Comparative Example 1 (Left) with the naked eye.

As shown in FIG. 2, it could be confirmed that silicon in the silicon-carbon-polymer matrix slurry prepared by Example 1 was bound to the graphite to have a network structure due to the polymer matrix, thereby being significantly uniformly dispersed without layer separation. Meanwhile, silicon in the silicon-carbon slurry prepared by Comparative Example 1 was not bound to the graphite, but the graphite was deposited to cause layer separation.

Figure 3A:
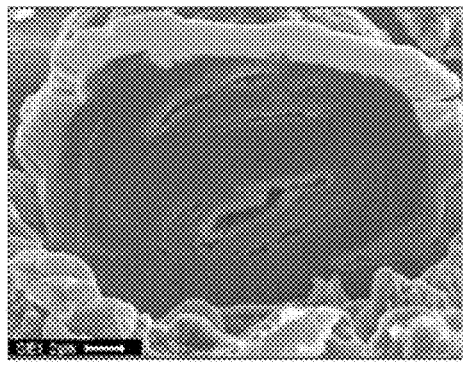
FIG. 3a is a scanning electron microscope (SEM) image of the carbon-silicon composite manufactured by Example 1.
Figure 3B:
FIG. 3b is an energy dispersive spectrometer (EDAX) image of carbon (C) in the carbon-silicon composite manufactured by Example 1.
Figure 3C:
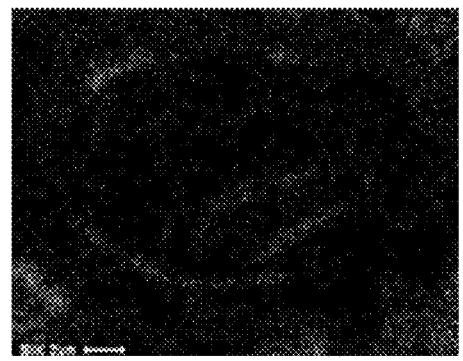
FIG. 3c is an energy dispersive spectrometer (EDAX) image of silicon (Si) in the carbon-silicon composite manufactured by Example 1.

FIG. 3a is a scanning electron microscope (SEM) image of the carbon-silicon composite manufactured by Example 1, FIG. 3b is an energy dispersive spectrometer (EDAX) image of carbon (C) in the carbon-silicon composite manufactured by Example 1, and FIG. 3c is an energy dispersive spectrometer (EDAX) image of silicon (Si) in the carbon-silicon composite manufactured by Example 1.

As shown in FIG. 3a, as results obtained by observing the carbon-silicon composites by SEM, it could be confirmed that the carbon-silicon composite manufactured by Example 1 was disposed so that the graphite forms inner pores in the silicon-carbon-polymer carbonized matrix structure, and silicon was bound to the graphite, and a portion of the silicon was intensively dispersed in the inner pores.

As shown in FIG. 3b and FIG. 3c, as a result obtained by observing the carbon-silicon composites by EDAX, the carbon-silicon composite manufactured by Example 1 had a weight ratio of silicon (Si) to carbon (C) of 4:96.

Experimental Example

Charge and discharge properties of the secondary batteries manufactured by Example 1 and Comparative Examples 2 and 3 were tested under the following conditions.

When it is assumed that 300 mA per 1 g is 1 C, charge conditions were controlled by a constant current at 0.2 C up to 0.01V, and a constant voltage at 0.01V up to 0.01 C, and discharge conditions were measured by the constant current at 0.2 C up to 1.5V.

Figure 4:
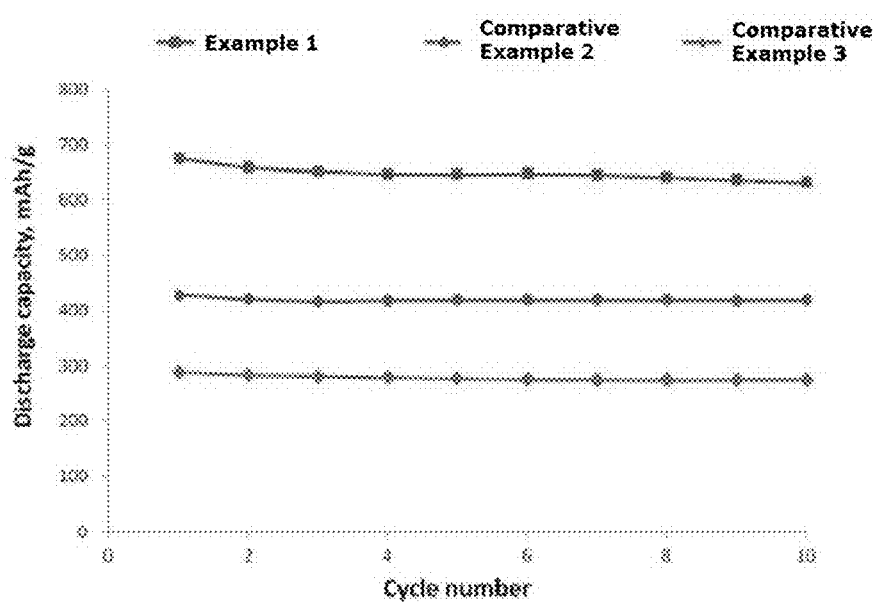
FIG. 4 is a graph illustrating results obtained by measuring discharge capacity according to cycle number on secondary batteries manufactured by Example 1 and Comparative Examples 2 and 3.

FIG. 4 is a graph illustrating results obtained by measuring discharge capacity according to cycle number on secondary batteries manufactured by Example 1 and Comparative Examples 2 and 3. Table 1 below shows results of initial charge capacity (mAh/g), and results of charge capacity retention rate (%) after 10 cycles obtained by converting a charge capacity retention rate after 10 cycles in relation to the initial charge capacity, into percent (%).

TABLE 1

|  | Example 1 | Comparative Example 2 | Comparative Example 3 |
| --- | --- | --- | --- |
| Initial Charge Capacity (mAh/g) | 674 | 428 | 290 |
| Charge Capacity Retention Rate (%) After 10 Cycles | 94.5 | 97.9 | 95.0 |

As shown in FIG. 4 and Table 1, as a result obtained by using the carbon-silicon composite including the silicon-carbon-polymer carbonized matrix structure as the anode active material, it could be confirmed that the secondary battery manufactured by Example 1 had remarkably high initial charge capacity due to high capacity silicon and graphite as compared to the secondary batteries manufactured by Comparative Examples 2 and 3, and retained the charge capacity retention rate after 10 cycles at the same level as those of the secondary batteries manufactured by Comparative Examples 2 and 3.

The above description of the present invention is provided for illustrative purposes, and it will be understood to those skilled in the art that the exemplary embodiments can be easily modified into various forms without changing the technical spirit or essential features of the present invention. Accordingly, the exemplary embodiments described herein are provided by way of example only in all aspects and should not be construed as being limited thereto.

The invention claimed is:

1. A manufacturing method of a carbon-silicon composite, the manufacturing method comprising:
   (a) preparing a silicon-carbon-polymer matrix slurry including a silicon slurry, carbon particles, a monomer of polymer, and a cross-linking agent;
   (b) performing a heat treatment process on the silicon-carbon-polymer matrix slurry to manufacture a silicon-carbon-polymer carbonized matrix;
   (c) pulverizing the silicon-carbon-polymer carbonized matrix to manufacture a silicon-carbon-polymer carbonized matrix structure; and
   (d) mixing the silicon-carbon-polymer carbonized matrix structure with a first carbon raw material and performing a carbonization process to manufacture a carbon-silicon composite.

2. The manufacturing method of claim 1, wherein the carbon particles in (a) includes at least one selected from the group consisting of natural graphite, artificial graphite, soft carbon, hard carbon, pitch carbide, calcined coke, graphene, carbon nanotube, and combinations thereof.

3. The manufacturing method of claim 1, wherein when a particle diameter at 50% cumulative mass particle size distribution of silicon in the silicon slurry in (a), is D50, 2 nm <D50<180 nm is satisfied.

4. The manufacturing method of claim 1, wherein the monomer of polymer in (a) is at least one selected from the group consisting of acrylic acid, acrylate, methyl methacrylic acid, methyl methacrylate, acryamide, vinyl acetate, maleic acid, styrene, acrylonitrile, phenol, ethylene glycol, lauryl methacrylate and vinyl difluoride.

5. The manufacturing method of claim 1, wherein the cross-linking agent in (a) is at least one selected from the group consisting of polyethylene glycol dimethacrylate, polyethylene glycol diacrylate, diethylene glycol dimethacrylate, diethylene glycol diacrylate, triethylene glycol diacrylate, tetraethylene glycol diacrylate, N,N-methylenebisacrylamide, N,N-(1,2-dihydroxyethylene)bisacrylamide) and divinylbenzene.

6. The manufacturing method of claim 1, wherein the monomer of polymer has 30 to 100 parts by weight, and the cross-linking agent has 5 to 100 parts by weight, in relation to 100 parts by weight of the silicon slurry in (a).

7. The manufacturing method of claim 1, wherein the silicon-carbon-polymer carbonized matrix in (b) has a network structure which is cross-linked by the cross-linking agent.

8. The manufacturing method of claim 1, wherein the heat treatment process in (b) is performed at 300° C. to 500° C. for 0.5 to 5 hours.

9. The manufacturing method of claim 1, wherein the carbonization process in (d) is performed at 400° C. to 1400° C. for 1 to 24 hours.

10. The manufacturing method of claim 1, further comprising:
(e) mixing the carbon-silicon composite with a second carbon raw material, and then performing an additional carbonization process.

11. A carbon-silicon composite comprising:
silicon-carbon-polymer carbonized matrix structure particles, comprising:
a polymer matrix having a network structure consisting of knots and chains connecting the knots with a cross-linking point;
carbon particles dispersed in the polymer matrix; and
silicon dispersed in the silicon-carbon-polymer carbonized matrix structure particles, wherein the silicon is bound to the carbon particles; and
a first carbon body, wherein the first carbon body is carbonized, and the silicon-carbon-polymer carbonized matrix structure particles are captured and dispersed in the first carbon body;
wherein the carbon particles are connected to each other and to the first carbon body to form inner pores,
wherein at least a portion of the silicon is in the inner pores,
wherein the silicon-carbon-polymer carbonized matrix structure particle has a porosity higher than a porosity of the first carbon body.

12. The carbon-silicon composite of claim 11, wherein the carbon particles includes at least one selected from the group consisting of natural graphite, artificial graphite, soft carbon, hard carbon, pitch carbide, calcined coke, graphene, carbon nanotube, and combinations thereof.

13. The carbon-silicon composite of claim 11, wherein the first carbon body includes at least one selected from the group consisting of soft carbon, hard carbon, pitch carbide, calcined coke, graphene, carbon nanotube, and combinations thereof.

14. The carbon-silicon composite of claim 11, wherein a weight ratio of silicon (Si) to carbon (C) is 1:99 to 10:90.

15. The carbon-silicon composite of claim 11, wherein the first carbon body particles are present in an amount ranging from 50 wt % to 94 wt % and the silicon-carbon-polymer carbonized matrix structure is present in an amount ranging from 6 wt % to 50 wt %, in relation to total weight of the carbon-silicon composite.

16. An anode for a secondary battery manufactured by coating an anode slurry on an anode current collector, the anode slurry including: the carbon-silicon composite of claim 11; a conductive material; a binder; and a thickening agent.

17. A carbon-silicon composite comprising:
carbon-silicon composite spherical particles, wherein the carbon-silicon composite spherical particles are composed of the carbon-silicon composite of claim 11; and
second carbon body spherical particles,
wherein the second carbon body spherical particles are carbonized, and
wherein pores are formed between the carbon-silicon composite spherical particles and the second carbon body spherical particles.

18. The carbon-silicon composite of claim 17, wherein the second carbon body spherical particles comprise at least one selected from the group consisting of natural graphite, artificial graphite, soft carbon, hard carbon, pitch carbide, calcined coke, graphene, carbon nanotube, and combinations thereof.

* * * * *